United States Patent [19]
Overby et al.

[11] Patent Number: 5,951,032
[45] Date of Patent: Sep. 14, 1999

[54] AIR SUSPENSION SYSTEM

[75] Inventors: Jerry L. Overby; Dennis A. Beukelman, both of Sioux Falls; Brian L. Reynolds, Chester, all of S. Dak.

[73] Assignee: Timbren Industries Incorporated, Ontario, Canada

[21] Appl. No.: 09/015,853

[22] Filed: Jan. 29, 1998

[51] Int. Cl.⁶ .............................. B60G 9/02; B60G 11/46
[52] U.S. Cl. ............................ 280/124.116; 280/124.163
[58] Field of Search ..................... 280/124.116, 124.163, 280/124.162, 124.157, 683, FOR 168, FOR 169, FOR 170; 267/256, 31

[56] References Cited

U.S. PATENT DOCUMENTS

| | | | |
|---|---|---|---|
| 2,869,891 | 1/1959 | Venditty et al. | 280/124.116 |
| 3,154,321 | 10/1964 | McLean | 280/124.116 |
| 3,434,707 | 3/1969 | Raidel | 280/124.163 |
| 4,379,572 | 4/1983 | Hedenberg | 280/124.116 |
| 4,615,539 | 10/1986 | Pierce | 280/124.116 |
| 5,112,078 | 5/1992 | Galazin et al. | 280/124.116 |
| 5,375,871 | 12/1994 | Mitchell et al. | 280/124.116 |

FOREIGN PATENT DOCUMENTS

| | | | |
|---|---|---|---|
| 990940 | 5/1965 | United Kingdom | 280/168 |

OTHER PUBLICATIONS

Hendrickson Trailer Suspension Systems brochure, 8 pgs. (Feb. 16, 1996).
Neway® RLU–200/228 Low Profile Trailer Air Suspension Series, 2 pgs. (Copyright © 1997).
Neway® RL–196/228 Versatile Trailer Air Suspension Series, 5 pgs. (Copyright © 1997).

*Primary Examiner*—Peter C. English
*Attorney, Agent, or Firm*—Kaardal & Associates, PC

[57] ABSTRACT

An air suspension system including an air spring that is mounted underneath a frame of the trailer forward of an axle of the trailer at one end of the axle. The air spring is supported under the frame by a lower support that supports a bottom of the air spring and an upper support that supports a top of the air spring. The lower support is connected to the frame forward of the air spring and is further connected to the axle, while the upper support is disposed between the top of the air spring and the frame. An identical air spring arrangement is provided at the opposite end of the axle.

24 Claims, 4 Drawing Sheets

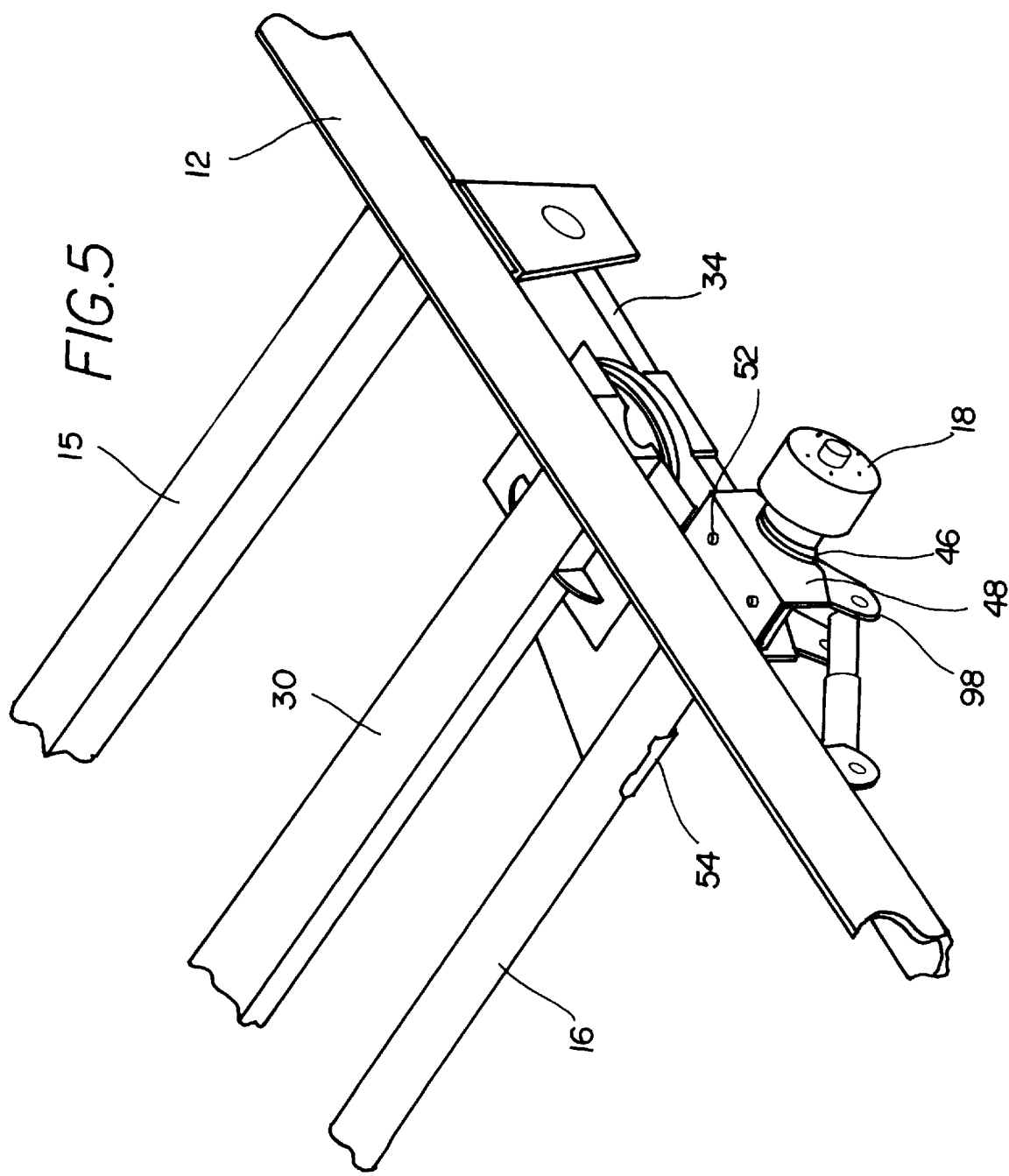

AIR SUSPENSION SYSTEM

FIELD OF THE INVENTION

This invention relates to a suspension system, and particularly to an air suspension system on a trailer for providing an improved ride and a low trailer height to facilitate loading and unloading of the trailer.

BACKGROUND OF THE INVENTION

Trailers in general are well known for use in transporting various loads while being pulled by a towing vehicle. In particular, trailers are often designed so as to transport horses and other animals from one location to another. However, transporting animals in such a manner frequently causes damage to the animals, especially to the legs of the animals, due to the poor ride quality of many trailers. This is particularly evident when transporting horses, which remain standing during transport, and thus shocks and jolts generated by the trailer while rolling over the road are transmitted into the legs of the horse(s). Since the ride quality of a trailer is controlled largely by the suspension system of the trailer, a suspension system that improves the ride quality is desired. While an improved ride is beneficial in trailers used to transport animals. an improved ride is beneficial to other types of trailers as well.

A trailer, such as a trailer used to transport animals, should also be as low to the ground as possible in order to make loading and unloading of cargo from the trailer easier. A trailer that is low to the ground also has a low center of gravity, thereby increasing the stability of the trailer. Further, the width of the trailer should be as large as possible in order to increase the stability of the trailer.

Therefore there exists a need for a trailer having an improved suspension system that makes the ride smoother, such as when transporting animals, thus reducing damage to the animals. The trailer must also have a low loading height to make loading and unloading easier, and should have a maximum width to increase the stability of the trailer.

SUMMARY OF THE INVENTION

Therefore the general purpose of the present invention is to provide a suspension system for a trailer that utilizes an air spring located in a unique location to provide an improved ride and a low trailer height to facilitate loading and unloading of the trailer.

A preferred embodiment of the suspension system in accordance with the principles of the present invention includes an air spring that is mounted underneath a frame of the trailer ahead, or forward, of the trailer axle at one end thereof. The air spring is supported under the frame by a lower support that supports a bottom of the air spring and an upper support that supports a top of the air spring. The lower support is connected to the frame ahead of the air spring and is further connected to the axle, while the upper support is disposed between the top of the air spring and the frame. An identical air spring arrangement is provided at the opposite end of the axle.

By placing the air spring forward of the axle, a superior ride is achieved. Further, the spring rate is lowered compared with an air spring located to the rear of the axle, which helps to improve the ride, and a shallow air spring design with excellent axle travel is permitted. Additionally, the suspension system according to the present invention has a low mount, thus lowering the center of gravity of the trailer and lowering the floor height of the trailer, thereby creating easier loading and unloading, and further providing optimal ground clearance and increasing cargo capacity. The design of the suspension system is compact, which permits its use on trailers having multiple axles without requiring additional space as compared to standard spring or torsion suspensions, and which permits the shortest possible wheel well area, thus conserving cargo space.

In accordance with the invention, the air spring is a resilient diaphragm structure which has a changeable volume to permit adjustments to the height of the trailer. The lower support for the air spring comprises an elongate, resilient spring beam disposed underneath the air spring and a support plate disposed between the spring beam and the bottom of the diaphragm. One end of the spring beam is connected to the frame ahead of the air spring and the plate is rigidly fastened to the axle and to the spring beam. The design of the spring beam results in optimal ground clearance for the trailer, and the flexible nature of the spring beam eliminates the need for additional bushings commonly found on conventional suspension systems utilizing a corresponding spring structure. Further, by designing the spring beam properly, excellent roll stiffness is achieved. The air spring is also protected by the plate from road hazards, such as rocks and the like, which could cause damage to the air spring during operation of the trailer.

The lower support includes first and second arcuate axle saddles affixed to the axle by welding at spaced locations along the axle so as to support opposite circumferential portions of the axle. The welds between the axle saddles and the axle are preferably angled or curved in order to provide increased connection strength between the axle saddles and the axle, when compared with straight line welds. In one embodiment, the first axle saddle can be fixed to the top of the axle and the second axle saddle fixed to the bottom of the axle, with the spring beam disposed under the second axle saddle and under the axle. Alternatively, the first and second axle saddles can be reversed, such that the first axle saddle is fixed to the bottom of the axle and the second axle saddle fixed to the top of the axle, with the spring beam disposed on top of the second axle saddle and over the axle. By reversing the axle saddles in this manner, the ride height of the trailer can be altered. For instance, it has been found that a ride height variation of up to 6.125 inches can be achieved. Further, as stated previously, the use of angled or curved welds to connect the axle saddles to the axle results in a much greater attachment strength when compared with a straight line weld.

A hanger bracket is preferably attached to the frame ahead of the air spring and the end of the spring beam is pivotally attached to the hanger bracket by a stepped bolt and bushing assembly. The bolt can be made from high grade steel, with the bushing being made from a high grade urethane, for long life and low maintenance. The bolt and bushing assembly is easy to install, with the bushing pivoting with the spring beam around the bolt during use.

In addition, the upper air spring support preferably includes a plate connected to the top of the diaphragm and a bar connected to the top of the plate and extending to an opposite side of the frame parallel with the axle to connect with an additional plate on an identical air spring arrangement on the other side of the frame. The frame on each side rests on top of the bar. With this design, a high strength, light weight, full width trailer support is achieved.

The present invention further includes a trailer assembly having a suspension system in which a portion of the suspension system is connected by an angled or curved weld to the axle of the trailer. As explained previously, the use of an angled weld results in much greater attachment strength between the suspension system and the axle.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying description, in which there is described a further embodiment of the invention.

BRIEF DESCRIPTION OF THE DRAWINGS

FIG. 5 shows an alternate embodiment of the suspension system where the spring beam is located over the axle.

DETAILED DESCRIPTION OF THE PREFERRED EMBODIMENT

Figure 1:
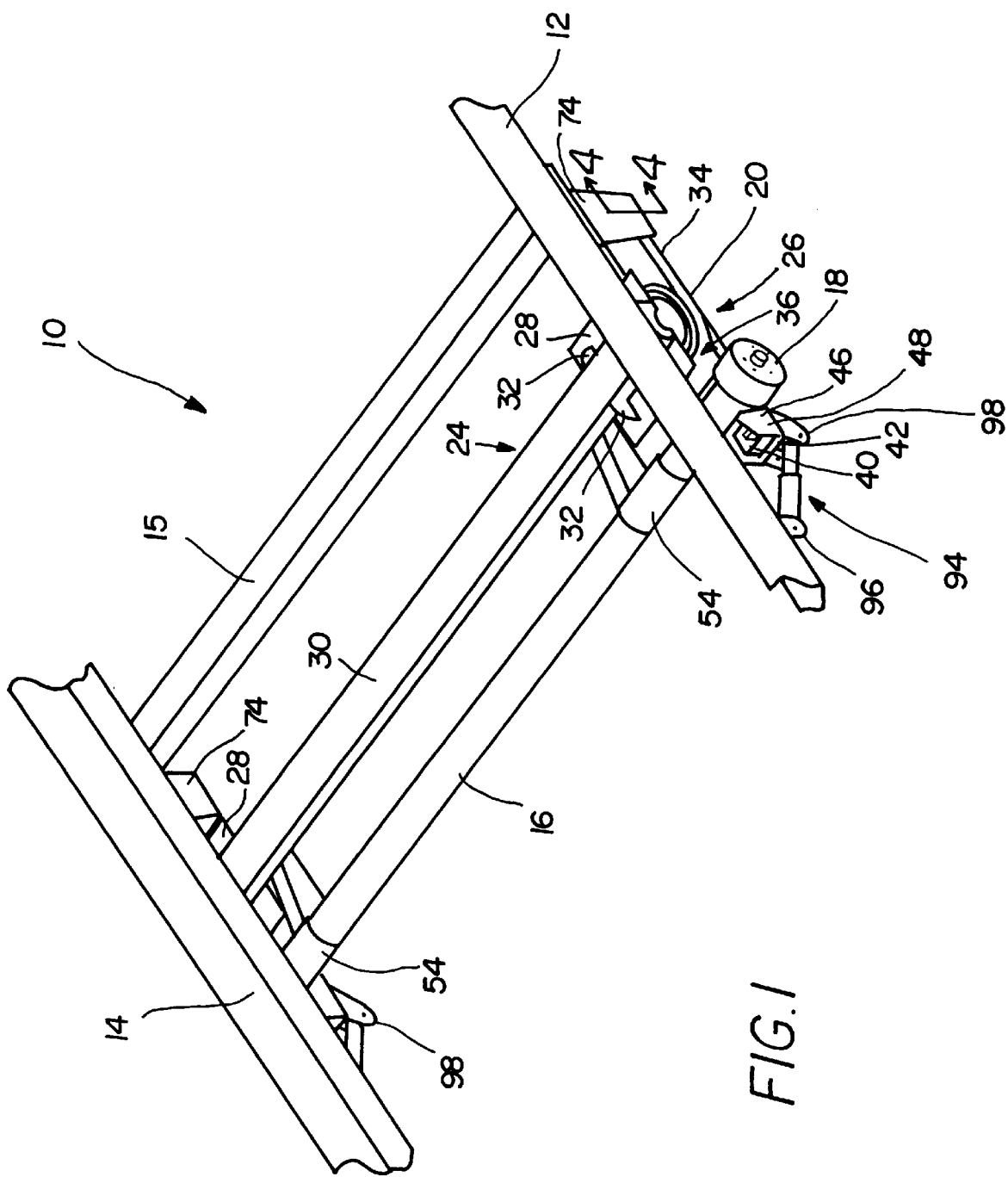
FIG. 1 is an elevated, right-side rear perspective view of a portion of the trailer illustrating the location of the air springs relative to the axle of the trailer.

Referring now to FIG. 1, a portion of a trailer frame 10 for a trailer is illustrated. The frame 10 includes first and second longitudinally extending, spaced frame members 12,14 that form the main support structure of the trailer. As is conventional, cross member(s) 15 (only one being shown in FIG. 1) will be connected between the frame members at suitable locations thereon, in order to maintain the spacing between the members and provide rigidity to the frame. It is to be understood that FIG. 1 illustrates only a portion of the frame members 12,14, and that the frame members 12,14 extend a further distance both forward and rearward to front and rear trailer ends in order to provide a full length trailer frame. A conventional trailer hitch is preferably provided at the front end of the trailer to permit attachment of the trailer to a towing vehicle, such connections being standard and thus needing no further description. The invention, as described herein, is preferably used on trailers in which a smooth ride and ease of loading is desired, such as a trailer used to carry horses or other animals, although the invention is useful on other types of trailers as well.

An axle 16 is non-rotatably disposed underneath the frame members and extends therebetween perpendicular to the longitudinal axes of the frame members. A hub 18 is rotatably disposed on each end of the axle (only one hub being visible in FIG. 1) to allow wheels to be mounted thereon, thereby permitting the trailer to roll across the ground. The trailer and frame thus far described are generally conventional, and thus need no further description.

In order to improve the ride of the trailer, an air spring 20 is mounted underneath each frame member forward of the axle 16 (only one air spring 20 being visible in FIG. 1). By mounting the air springs forward of the axle, the spring rate is lowered, thus creating a better ride compared with air springs mounted behind the axle, and shallow air springs with excellent axle travel are permitted. The arrangement of the air springs 20 are identical to each other, with the air springs cooperating to support the trailer frame 10. Each air spring 20 comprises a resilient diaphragm structure having a changeable volume in order to permit adjustments to the spring rate and to the overall height of the trailer. The air springs are suitably connected with an air supply system to permit adjustments to the air spring volume. Diaphragm structures are conventional in the art and therefore the air springs 20 are not further described herein.

Each air spring is supported underneath the respective frame member 12,14 by a support means including an upper support 24 supporting the top of the air spring and a lower support 26 supporting the bottom of the air spring. As seen in FIG. 1, the upper support 24 comprises a flat, rectangular plate 28 which is securely attached to the top of the respective air spring. A bar 30 is attached at each of its ends to the top surface of the plates 28 and extends between the frame members 12,14 generally parallel to the axle 16. The bar 30 is disposed between the top surfaces of the plates and the frame members 12,14 such that the frame members rest upon the top of the bar. In this manner, the frame is supported by the air springs. A plurality of gussets 32 are preferably connected to the top surfaces of the plates and the sides of the bar in order to reinforce the connection between the bar and plates.

Figure 2:
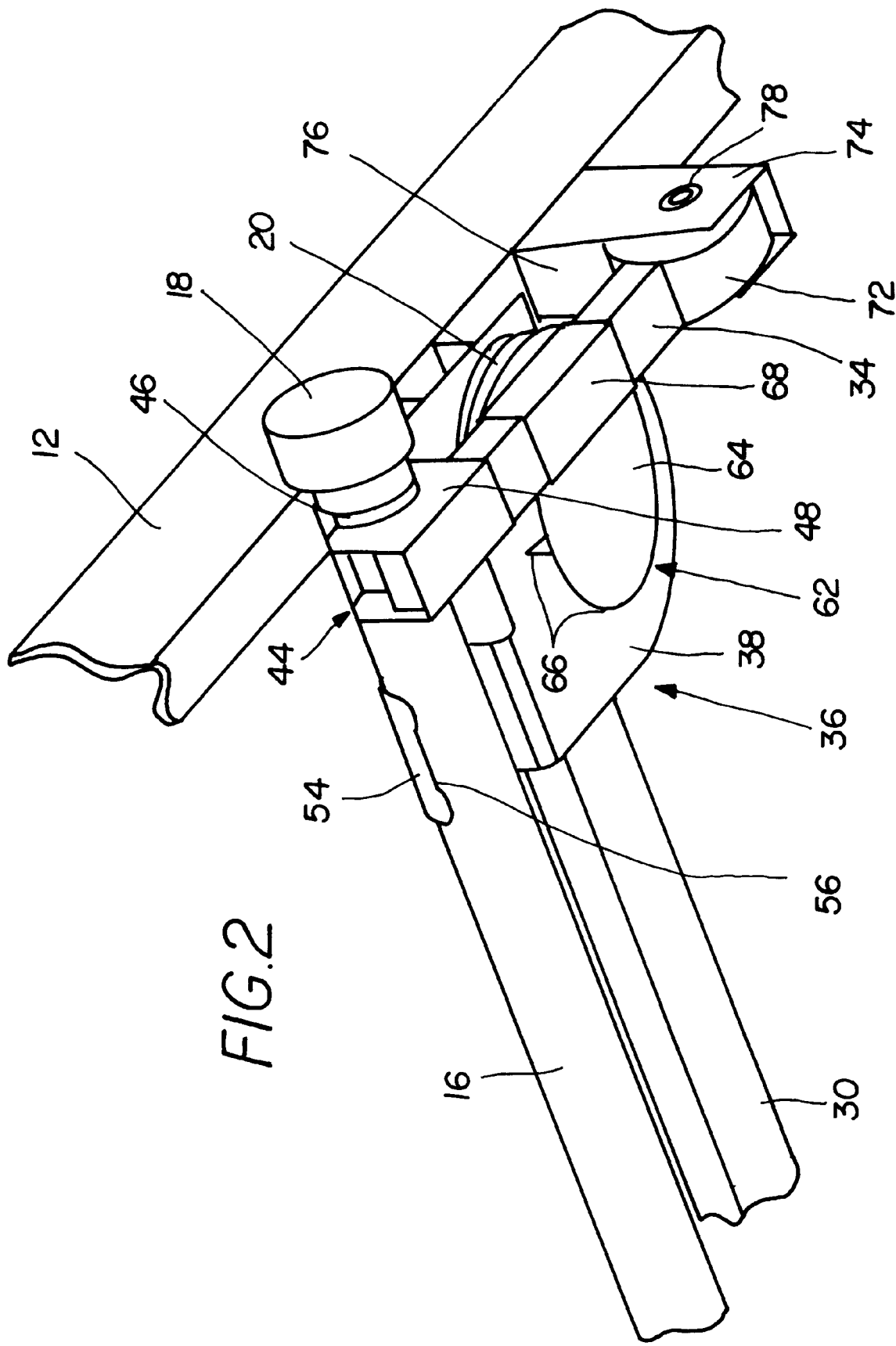
FIG. 2 is a bottom perspective view of the right-side of the arrangement in FIG. 1.
Figure 3:
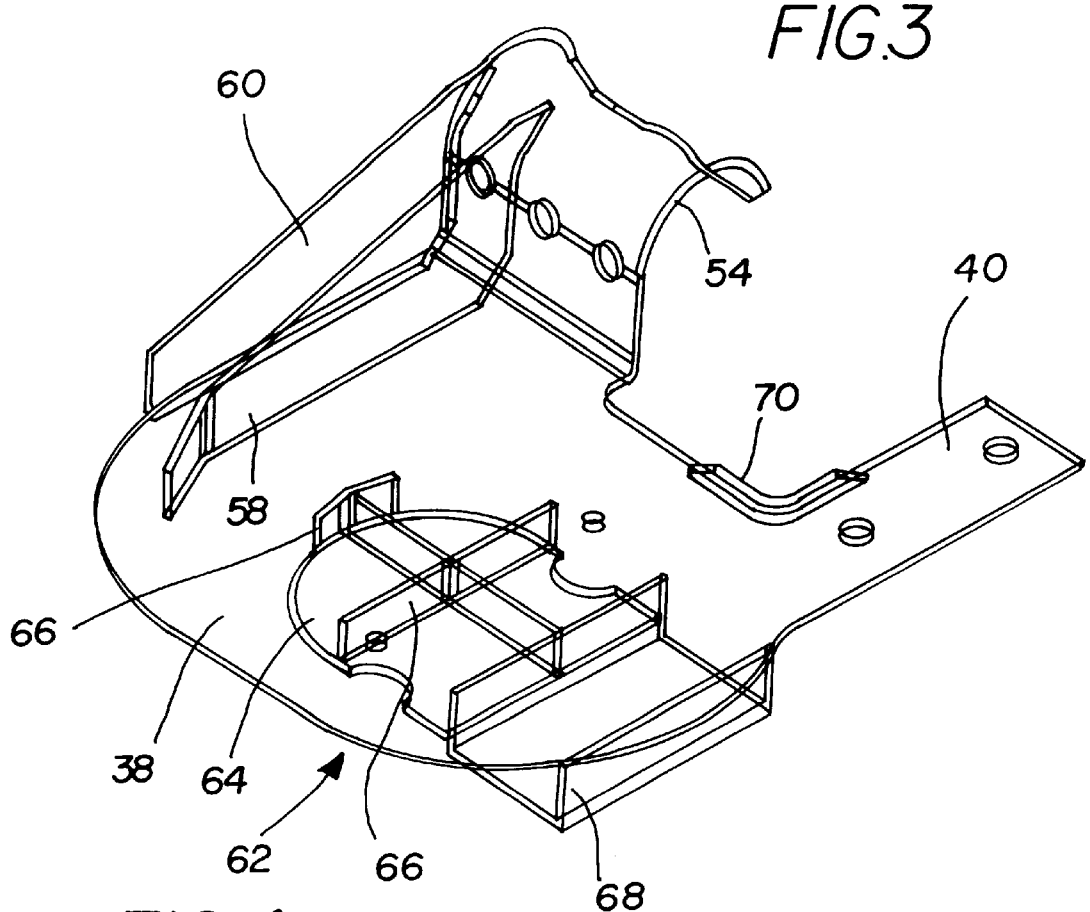
FIG. 3 is a top perspective view of the diaphragm support plate.

With reference to FIGS. 1–3, it can be seen that the lower support 26 includes an elongate, resilient spring beam 34 affixed at one end to the respective frame member. A diaphragm support plate 36 is attached to the opposite end of the spring beam, and supports the bottom of the air spring. As best seen in FIGS. 2–3, the support plate 36 includes a central planar portion 38 which is connected to the bottom of the air spring and which is supported by the spring beam. The area of the planar portion is greater than the area of the bottom of the air spring, such that the air spring is completely supported by the support plate. Further, by making the area of the planar portion greater than the area of the bottom of the air spring, the air spring is protected by the planar portion from damage due to rocks and other road hazards that are encountered during use of the trailer. Each support plate 36 is self-supporting in that there is no direct connection between the two opposite plates 36, thus increasing the ground clearance of the trailer between the frame members.

A finger 40 extends rearwardly from the planar portion 38, and is disposed on top of the spring beam 34 and connected thereto, such as with bolts 42. An axle saddle assembly 44 is disposed over the end of the spring beam 34 in order to connect the lower support 26 to the axle 16. The axle saddle assembly 44 includes an arcuate axle saddle 46 supporting a bottom portion of the axle, and a saddle support 48 for supporting the axle saddle 46 on the end of the spring beam. The axle saddle 46 is shaped so as to receive the bottom portion of the circular axle 16 and provide support therefore. Therefore, the saddle 46 is curved to match the curvature of the axle, and faces upward so that the bottom of the axle fits therein. The saddle 46 is preferably connected to the axle by welding, in a manner to be described below. The saddle 46 is also secured to the saddle support 48 in any suitable fashion, with the saddle support 48 being fit over the end of the spring beam, such that the finger 40 and the end of the spring beam are disposed between the bottom of the saddle 46 and the saddle support 48. The saddle support 48 itself is secured to the spring beam in any suitable manner, such as by welding or using bolts 52 as shown in the embodiment of FIG. 5.

An arcuate axle saddle 54 also extends rearwardly from the planar portion 38 of the support plate 36, and is spaced from the axle saddle 46 toward the inside of the frame members. The axle saddle 54, like the saddle 46, is curved to match the curvature of the axle, but the saddle 54 faces downward, so as to fit around the top portion of the axle and provide support therefore. The axle saddle 54 is also connected to the axle by welding. As can be seen in FIG. 2, the end 56 of the saddle 54 is angled or curved, such that when the end 56 is welded to the axle 16, an angled or curved weld results. The end of the saddle 46 is similarly angled or curved, such that when the end of the saddle 46 is welded to the axle, an angled or curved weld results. Applicant has found that by using welds that are angled or curved relative to the axis of the axle, a greater attachment strength between the axle saddles 46,54 and the axle 16 is achieved, compared with a straight line weld.

In the embodiment shown in FIGS. 1–2, since the saddle 46 supports the bottom of the axle, the spring beam is disposed under the axle, thus minimizing the overall height of the trailer. Alternatively, as shown in FIG. 5, the axle saddles 46',54' can be reversed so that the spring beam is disposed over the axle, with the axle saddle 46' supported by the saddle support 48' so as to face downward and support the top of the axle, and the axle saddle 54' facing upward and secured to the bottom of the axle, thus increasing the height of the trailer. The embodiment of FIG. 5 is otherwise identical to the embodiment shown in FIGS. 1–4. Thus, by locating the spring beam either under or over the axle, the height of the trailer can be adjusted to suit different needs. It has been found that up to a 6.125" ride height variation is achievable by reversing the axle saddles in this manner.

Returning to FIG. 3, it can be seen that a side plate 58 is further affixed to the planar portion 38 and the axle saddle 54, and extends vertically from the planar portion 38, for supporting a side of the air spring. The support plate 36 is preferably reinforced in order to prevent damage thereto during use. Part of the reinforcement includes a side plate 60 that is preferably secured to the planar portion 38 and the saddle 54 and extends generally parallel to the side plate 58. Further, a stiffening member 62 is secured to the bottom of the planar portion 38 in order to reinforce the area of the planar portion located directly underneath the air spring. The stiffening member 62 includes a plate portion 64 disposed generally parallel to the planar portion 38 and spaced therefrom by a plurality of vertical stiffening plates 66. A U-shaped channel portion 68 is connected to the end of the plate portion 64, with the spring beam 34 being disposed in the channel portion 68 underneath the planar portion 38. A further reinforcing member 70 is preferably provided in the corner between the planar portion 38 and the finger 40. It is to be realized however, that other forms of reinforcement can be used if desired.

Thus, the support plate 36 completely supports the bottom of the air spring, as well as a portion of the side of the air spring, with the support plate 36 being sufficiently reinforced in order to withstand operational loads. Further, the support plate protects the air spring from damage due to road hazards, such as rocks and other debris, which might ordinarily come into contact with, and damage, the air spring during use of the trailer.

Referring to FIG. 2, it can be seen that the spring beam 34 includes a looped end 72 that is pivotally attached to a hanger bracket 74 which extends downward from the respective frame member, forward of the axle. The hanger brackets 74 are appropriately fixed to the frame members, such as by welding or using bolts, and the brackets define a channel 76 into which the looped ends 72 are received. Bolts 78 extend through holes provided in the side walls of the hanger brackets 74 and extend through the looped ends 72, in order to pivotally attached the spring beams to the hanger brackets.

Figure 4:
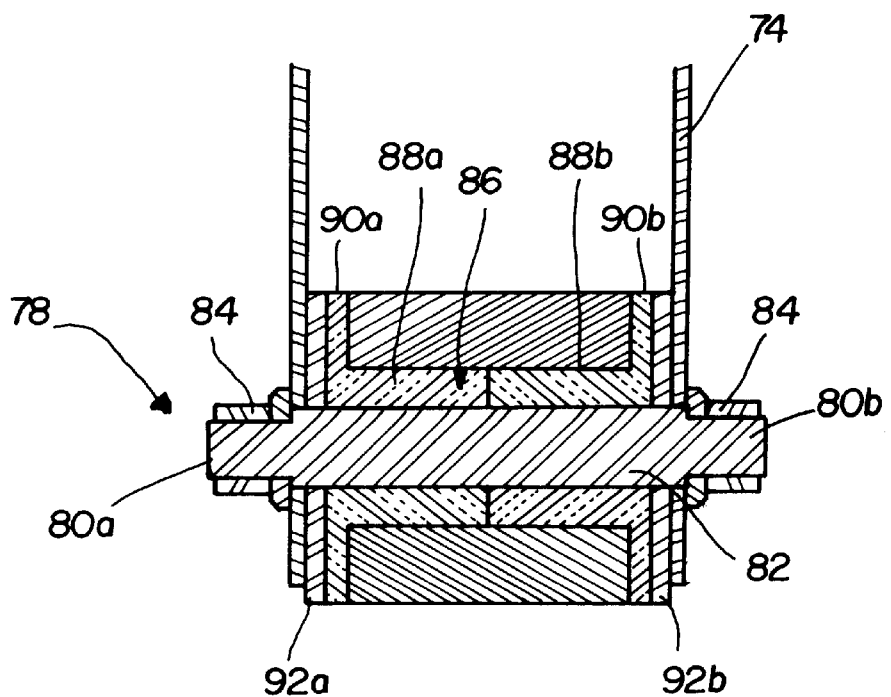
FIG. 4 is a sectional view along line 4—4 of FIG. 1, illustrating the stepped bolt and bushing arrangement that connects the spring beam to the hanger bracket.

As illustrated in FIG. 4, each bolt 78 includes stepped ends 80a, 80b having a smaller diameter than a central portion 82 thereof, thus giving the bolt a stepped configuration. The stepped ends are preferably provided with threads to permit attachment of nuts 84, or the like, for securing the bolt 78 in place. The bolt is preferably made of a high grade steel with a satin finish, although other materials for the bolt could be used if desired. A bushing 86 made of a high grade urethane or like material is disposed around the central portion 82 of the bolt for pivoting movement relative thereto. The bushing 86 is formed by two separate pieces 88a, 88b for ease of assembly/disassembly, with enlarged shoulders 90a, 90b formed at the end of each piece 88a, 88b. Washers 92a, 92b are disposed around the central portion of the bolt between the enlarged shoulders of the bushing pieces and the side walls of the hanger bracket to permit pivoting of the enlarged shoulders relative to the sidewalls of the hanger brackets. The two bushing pieces are inserted into the looped end of the respective spring beam in a tight friction fit therewith, such that the looped end of the spring beam is disposed between the enlarged shoulders 90a, 90b. Due to the friction fit of the bushing pieces in the looped ends, the bushing pieces move with the spring beams and pivot therewith about the central portions of the bolts during movements of the axle as the trailer is in operation.

As an alternative, the side walls of the hanger brackets can be provided with horizontal slots, in place of bolt holes, to facilitate attachment of the looped ends to the hanger brackets. By using horizontal slots instead of holes, precise placement of the hanger brackets relative to the axle is not required, as the slots will permit attachment of the ends of the spring beams to the brackets even with variations in the distance between the hanger brackets and the axle.

In order to prevent over extension of the air springs, shock absorbers 94 are connected at one end to brackets 96 fixed to the frame members to the rear of the axle 16. The opposite ends of the shock absorbers are connected to brackets 98 that are fixed to the saddle support 48. In the embodiment of FIG. 5, since the saddle support 48' is inverted, the brackets 98' are preferably fixed to the arms of the saddle support 48' and extend downwardly therefrom. As is conventional, the shock absorbers preferably include suitable internal valving and are connected with a fluid supply system to permit adjustments to the stiffness of the shock absorber, so that the ride comfort of the suspension system can be adjusted.

In use of the trailer, as bumps and other uneven terrain are encountered by the wheels, the axle will deflect either up or down. Since the support plates for the air springs are rigidly attached to the axle, the plates follow the movements of the axle and transmit the movements into the air springs. Further, the resilient spring beams will also move up and down with the axle, pivoting with the bushings about the stepped bolts as they move. By locating the air springs ahead of the axle, the spring rate is lowered, thus creating an improved ride, and permitting a shallow air spring design having excellent axle travel.

While only a single axle 16 has been shown and described, it is to be understood that the present invention could be used on trailers having multiple axles, such as two, three or four axles, as long as in each case, the air springs associated with each axle are located forward of the respective axle. Therefore, there could be further axles ahead of and/or behind the axle shown in the figures, with each axle being associated with air spring arrangements of the type described herein.

It is to be understood that while certain embodiments of the present invention have been illustrated and described, the invention is not limited to the specific forms or arrangements of the parts described and shown.

I claim:

1. A suspension system for a trailer having a frame and an axle disposed underneath the frame, comprising:

an air spring disposed underneath the frame forward of the axle;

a lower support supporting a bottom of the air spring, said lower support being connected to the frame forward of the air spring and being connected to the axle; and an upper support supporting a top of the air spring, said upper support being disposed between the top of the air spring and the frame;

wherein said lower support comprises an elongate, resilient spring beam disposed underneath the air spring.

2. The suspension system according to claim 1, additionally comprising a support plate disposed between the spring beam and the bottom of the air spring, a first end of said spring beam being connected to said frame forward of the air spring and said plate being rigidly fastened to the axle and to the spring beam.

3. The suspension system according to claim 1, wherein said air spring comprises a resilient diaphragm having a changeable volume.

4. A suspension system for a trailer having a frame and an axle disposed underneath the frame, comprising:

an air spring disposed underneath the frame forward of the axle; and support means for supporting the air spring underneath the frame, said support means including a lower support supporting a bottom of the air spring and an upper support supporting a top of the air spring;

wherein said lower support is connected to the frame forward of the air spring and is connected to the axle, and said upper support is disposed between the top of the air spring and the frame; and wherein said lower support comprises an elongate, resilient spring beam disposed underneath the air spring and a support plate disposed between the spring beam and the bottom of the air spring, a first end of said spring beam being connected to said frame forward of the air spring and said plate being rigidly fastened to the axle and to the spring beam.

5. The suspension system according to claim 4, further including a first arcuate axle saddle connected to the support plate and a second arcuate axle saddle connected to the spring beam, said first and second arcuate axle saddles being spaced from each other and being affixed to the axle at spaced locations along the axle, and said first axle saddle and said second axle saddle support opposite circumferential portions of the axle.

6. The suspension system according to claim 5, wherein said second axle saddle is affixed to a bottom portion of the axle for supporting the bottom of the axle, and a second end of said elongate spring beam opposite said first end is disposed under said second axle saddle, whereby said second end of said elongate spring beam is disposed under said axle.

7. The suspension system according to claim 5, wherein said second axle saddle is affixed to a top portion of the axle for supporting the top of the axle, and a second end of said elongate spring beam opposite said first end is disposed on top of said second axle saddle, whereby said second end of said elongate spring beam is disposed over said axle.

8. The suspension system according to claim 5, wherein said first and second axle saddles are affixed to said axle by welds.

9. The suspension system according to claim 8, wherein said welds are angled relative to a longitudinal axis of the axle.

10. The suspension system according to claim 4, further including a side plate connected to said support plate and extending vertically relative thereto, said side plate supporting a side of the air spring.

11. The suspension system according to claim 4, further including a hanger bracket attached to the frame forward of said air spring, the first end of said elongate spring beam being pivotally connected to the hanger bracket.

12. The suspension system according to claim 11, wherein said first end is connected to the hanger bracket by a bolt, said bolt being stepped at opposite ends thereof and surrounded by a bushing, said bushing being secured to said first end and being pivotable therewith relative to the bolt.

13. The suspension system according to claim 4, wherein said upper support comprises a plate connected to the top of the air spring and a bar connected to the top of the plate and extending to an opposite side of the frame parallel with the axle, and said frame contacts a top surface of the bar.

14. The suspension system according to claim 13, further including at least one gusset connected to the bar and the plate for reinforcing the connection therebetween.

15. The suspension system according to claim 4, wherein said frame comprises first and second frame members, said frame members being spaced from each other with the axle extending therebetween; and further including one said air spring disposed underneath each said first and second frame member, and one said support means associated with each said air spring for supporting each said air spring underneath the respective frame member.

16. The suspension system according to claim 4, further including a shock absorber having a first end connected to the frame to the rear of the axle and a second end connected to the support means.

17. The suspension system according to claim 4, further including a stiffening member connected to a bottom of the support plate.

18. The suspension system according to claim 4, wherein said air spring comprises a resilient diaphragm having a changeable volume.

19. A trailer assembly comprising:

a frame;

an axle disposed underneath the frame and defining a longitudinal axis, said axle including first and second ends, and a suspension system mounted on at least one end of the axle, said suspension system including an air spring disposed beneath the frame, a lower support extending below said air spring, and a support plate situated between said air spring and said lower support;

wherein said support plate includes an upper axle saddle engaging said axle from above and said lower support includes a lower axle saddle cradling said axle from below at a location longitudinally spaced from said upper axle saddle for minimizing the height of the suspension system below said frame.

20. The trailer assembly according to claim 19, wherein said upper and lower axle saddles are welded to respective circumferential portions of the axle.

21. The trailer assembly of claim 19 wherein said lower support comprises a resilient spring beam.

22. The trailer assembly of claim 19 additionally comprising a shock absorber having a first end connected to the frame to the rear of the axle and a second end connected to the lower support.

23. A trailer assembly comprising:

a trailer frame, an axle disposed underneath the frame, said axle having first and second ends; and a suspension system disposed underneath the frame for supporting at least one end of the axle, said suspension system including an air spring located forward of the axle, and a lower support for supporting a bottom of the air spring and including a first end pivotally attached to the frame forward of the air spring and a second end fixedly attached to the axle; wherein said lower support comprises an elongate, resilient spring beam disposed underneath the air spring;

an upper support supporting a top of the air spring, said upper support being disposed between the top of the air spring and the frame;

a support plate disposed between the spring beam and the bottom of the air spring, a first end of said spring beam being pivotally connected to said frame forward of the air spring and said plate being rigidly fastened to the axle and to the spring beam;

a first arcuate axle saddle connected to the support plate and a second arcuate axle saddle connected to the spring beam, said first and second arcuate axle saddles being spaced from each other and being affixed to the axle at spaced locations along the axle, and said first axle saddle and said second axle saddle support opposite circumferential portions of the axle, wherein said second axle saddle is affixed to a bottom portion of the axle for supporting the bottom of the axle, and a second end of said elongate spring beam opposite said first end is disposed under said second axle saddle, whereby said second end of said elongate spring beam is disposed under said axle;

a side plate connected to said support plate and extending vertically relative thereto, said side plate supporting a side of the air spring;

a hanger bracket attached to the frame forward of said air spring, the first end of said elongate spring beam being pivotally connected to the hanger bracket; and a shock absorber having a first end connected to the frame to the rear of the axle and a second end connected to the lower support;

wherein said first end of said spring beam is connected to the hanger bracket by a bolt being stepped at opposite ends thereof and surrounded by a bushing, said bushing being secured to said first end of said spring beam and being pivotable therewith relative to the bolt;

wherein said first and second axle saddles are affixed to said axle by welds, said welds being angled relative to a longitudinal axis of the axle; and wherein said air spring comprises a resilient diaphragm having a changeable volume.

24. The trailer assembly according to claim 23, wherein said hanger bracket extends downwardly from the frame.

* * * * *